H. M. HARDING.
OVERHEAD MONORAIL TRACKWAY SYSTEM.
APPLICATION FILED DEC. 6, 1909.
961,348.
Patented June 14, 1910.
2 SHEETS—SHEET 1.
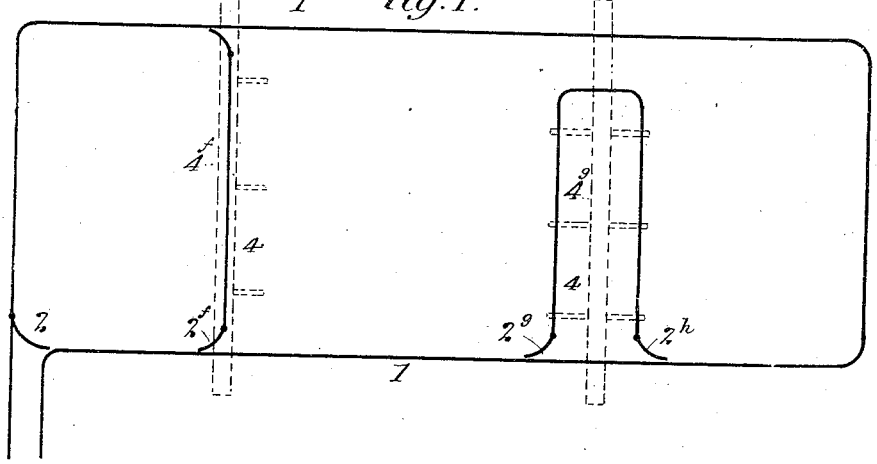
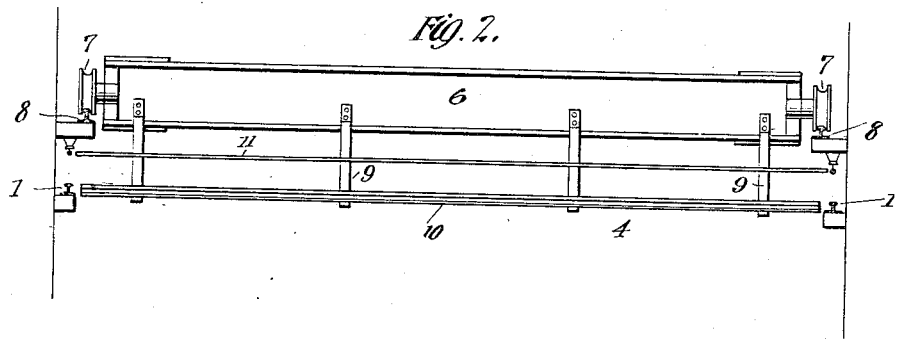
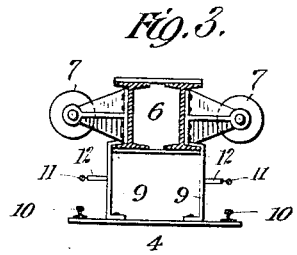
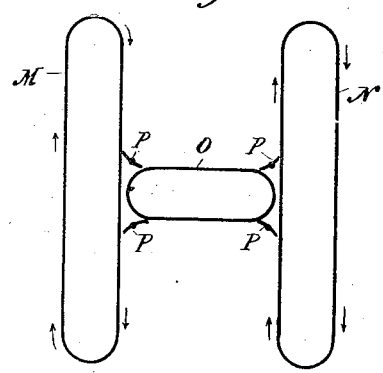
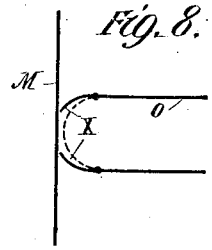
Witnesses:
Inventor
Henry M. Harding
By Attorney

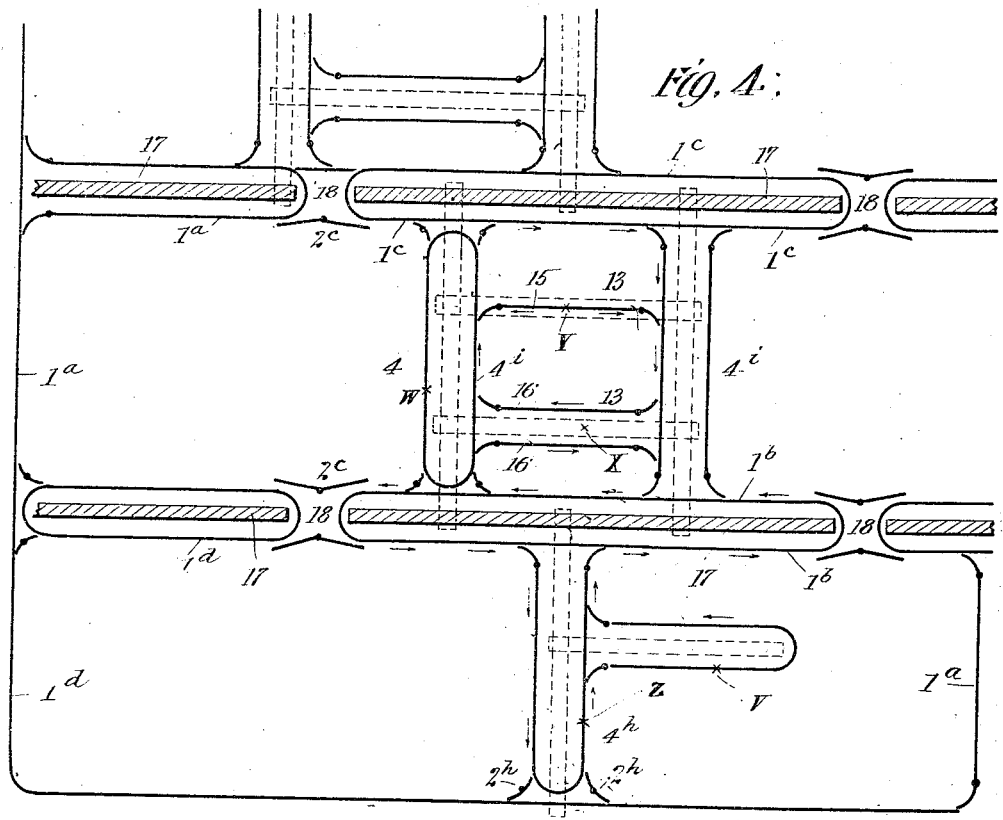
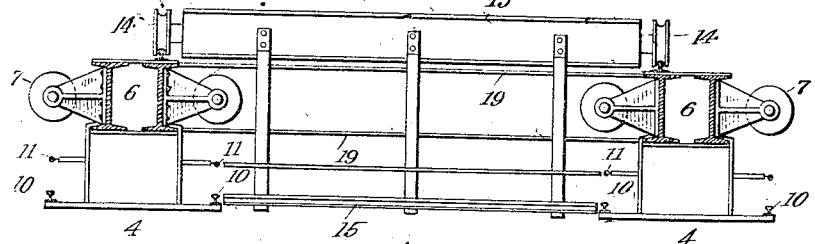
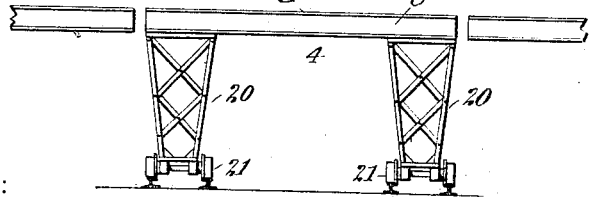

UNITED STATES PATENT OFFICE.

HENRY M. HARDING, OF NEW YORK, N. Y.

OVERHEAD MONORAIL TRACKWAY SYSTEM.

961,348.

Specification of Letters Patent. Patented June 14, 1910.

Application filed December 6, 1909. Serial No. 531,498.

*To all whom it may concern:*

Be it known that I, HENRY M. HARDING, a citizen of the United States, residing at New York, in the county and State of New York, have invented a new and useful Improvement in Overhead Monorail Trackway Systems, of which the following is a specification.

My invention relates to an overhead system of single or monorail tracks upon which electric carriers, either with or without hoists, are adapted to run, the carriers depending by gravity from the monorail tracks, and deriving the current for their propulsion from trolley wires or conductors which parallel the said tracks throughout the system.

The main object of the invention is to provide for handling freight, merchandise or any articles over considerable areas and in large quantities; in other words, to provide cheap, simple, but completely adequate transportation facilities for the purposes of piers, docks, freight yards, warehouses, etc., where merchandise has to be continually shifted about in numerous localities at the same time, and in large quantities.

It is evident that ordinary surface cars running on tracks are not suitable for the foregoing purposes as the tracks would take up the greater part of the storage floor space, and any ordinary traveling crane, such as is used in machine shops, is too local in its action at any particular time, and far too limited in the volume of its capacity, to be of any practical service. Overhead tracks and carriers have accordingly been employed, but in order to properly cover the area of use required, it is clear that an expensive and burdensome multiplicity of cross tracks, loops and switches become essential if such tracks are fixed in any particular locations. And no matter how numerous the tracks, there will always be intermediate spaces between the cross-tracks in which the goods frequently require rehandling. By my invention these difficulties are overcome, and a simple but completely adequate system of transportation provided.
With the foregoing and other objects in view, my invention consists in the features of construction and combination, as hereinafter set forth and claimed.

In the drawings: Figure 1 is a diagrammatic plan view showing one form of my invention; Fig. 2 is an end elevation showing certain details of what I term a traveling cross track; Fig. 3 is a transverse sectional view of the same; Fig. 4 is a view similar to Fig. 1, showing an extension of the system and embodying a variety of features, and features of combination, of my invention; Fig. 5 is a detail elevation showing what I term a traveling sub-cross track; Fig. 6 shows diagrammatically an element of my system; Fig. 7 shows a modified form of traveling cross track; and Fig. 8 shows another modified detail.

Referring to the drawings in which like parts are designated by the same reference sign, 1 designates an overhead monorail line or track on which any number of suspended electric carriers, either with or without hoists, are adapted to run. This line is fixed or permanent in its location and preferably runs in the form of a loop around the area or inclosure of the pier or yard in which transportation is to be had. There may, of course, be just one single loop of this sort as in Fig. 1, or the loop may be subdivided or form part of a system of fixed loops, as shown at $1^a$, $1^b$, $1^c$, $1^d$, etc., Fig. 4, in which case a single portion of the line may form part of several loops.

2 denotes switches of the ordinary or any desired sort by which the different local loops, or loop subdivisions, may be grouped together in different ways in the system. In accordance with the present invention the loops may be divided into two general classes: first, those which extend in a preferably narrow inclosure around a fixed wall or line of posts, see $1^b$ and $1^c$, Fig. 4, and, second, those which run in larger loops with opposite parallel spaced apart sides extending around the open areas of the pier or building, as shown in Fig. 1 and at $1^a$ and $1^d$ in Fig. 4. The latter loops are adapted to coöperate with the traveling cross tracks, and traveling sub-cross tracks above referred to and embodying the principles of my invention. For convenience I will term the two classes of loops as obstructed and open area loops respectively. As will later appear I sometimes provide a system inclosing a wide area and in which only open area loops are necessary or are used.

4 designates broadly in all the figures a traveling cross track embodying the principles of my invention.

$4^f$ indicates a form having a single cross line, and $4^g$ a form having two separate cross lines, which in Fig. 1 are, however, looped together at one end.

At 4ʰ (Fig. 4) the lines are adapted to be made either separate or looped together at the ends, by means of the switches 2ʰ, and the same is true of the two separate lines of one of the traveling cross tracks 4ⁱ (Fig. 4). I prefer to make use of a simple bridge, in many cases a single beam or girder 6, as the supporting frame for the traveling cross tracks, providing such bridge or girder with wheels 7 at the ends adapted to run on tracks 8 which parallel the opposite parallel sides of the open area loops 1 above mentioned. To the bridge or girder 6 there is fixed by means of any suitable arms beams or brackets 9, the cross lines or tracks 10 which are in the same horizontal plane or level as the stationary lines or loops 1.

2ᶠ, 2ᵍ, 2ʰ, etc., denote switches of any ordinary or any approved sort by which the cross lines or tracks 10 may be joined in continuity with the said fixed lines 1, or disconnected therefrom, as desired. These switches are arranged to make a sliding connection with the fixed lines 1 so as to coöperate equally therewith in all positions of the traveling cross tracks. The usual trolley wires or conductors 11 may be hung upon the brackets 12, paralleling the tracks 10 and preferably directly above the same, as shown in Figs. 3 and 4. The carriers themselves may be of any desired character; they do not form any direct part of the present invention.

It is clear that the invention is complete in its characteristics as above described, but I have included another feature which greatly extends its utility in certain cases. I refer to what I have termed the traveling sub-cross tracks, shown in Figs. 4 and 5 and broadly denoted 13. These comprise sub or secondary bridges spanning a pair of bridges one or both of which may be in the traveling cross track bridges 6 and having wheels 14 running on the respective bridges 6 of the pair, in the same manner that the bridges 6 run on their fixed tracks 8. The bridges 6 of such a pair should of course be tied together by any suitable distance rods or spanners 19 (omitted from Fig. 4 of the drawings for the sake of clearness). These traveling sub-cross tracks may have a single cross line 15 or a pair of separate cross lines 16, and suitable switches and trolleys similar in all respects to the lines 4ᶠ, 4ᵍ, 4ʰ, and 4ⁱ, of the traveling cross tracks 4 already described. It is an important characteristic of the system that all the sub-cross lines 15 are on the same horizontal plane or level as the cross lines 10, and the latter are on the same plane or level as the main lines or fixed loops 1. In other words, all the lines, both fixed and movable, are so hung as to be strictly in the same horizontal plane or line throughout the system. It is evident that all portions of the open areas of the pier or building can be looped over with lines forming part of a large or small system or combination of loops, suitable to either localized or comparatively long distance transportation, both going on, if desired, simultaneously, and from the same locality.

As thus far described I have considered the system as including walls or posts which support the fixed tracks 8, and such walls or posts are generally present in any building or roofed over structure. I have illustrated walls denoted 17 and formed with occasional doors, windows or open spaces 18 which may be provided or utilized as passages for the lines and carriers of my system. The opposite parallel side lines of the open area loops 1 preferably run close to the wall 17 on opposite sides thereof, and are joined together at the locations of the open spaces 18 to form the obstructed area loops already referred to. Switches 2ᶜ at these points are adapted to convert such side lines into portions of the open area loops or obstructed area loops as desired. In some cases an obstructed area loop may embrace two walls or lines of posts, thus providing an intermediate open space in which freight cars, for example, may be run. It is evident that this arrangement is, however, an obstructed area loop within the above definition. One or more loops such as 1ᵈ are frequently desired on the outside of a building such as a freight terminal warehouse, perhaps located under an awning roof thereof, and in such case are particularly well adapted to coöperate with the interior loop 1ᵃ, in the manner just described.

There are certain important conditions or characteristics that particularly connect the foregoing system or arrangement with the use of suspended carriers such as are employed with a monorail track. Each carrier must ordinarily have part of its construction, technically known as the "down come" either on one side or the other of the monorail track, and this down come prevents carriers being switched from one track to another in more than one particular direction. In other words it is not ordinarily possible, without the use of special carriers, to have switches forking from a cross track in both directions to a main line, since the down come would interfere, either on one side or the other. Furthermore as there is a large number of carriers constantly employed, and designed to move about simultaneously for the same and different purposes in different parts of the system, it becomes very desirable, if not essential, to have them all move in paths which never intersect in crossing, or return upon themselves, thereby dispensing with the necessity of service to prevent collisions between the different carriers.

The system of the present invention is particularly designed to satisfy the two foregoing requirements. I do not, of course, desire to be limited to these latter aspects of the invention, in regard to those broader aspects of the invention as hereinbefore first described, the said latter aspects being in the nature of additional results and features, rather than essential ones in the construction.

Referring to Fig. 6 there is shown what may be described as a triple unit, H-shaped loop, in which carriers may move in six different circuits, amounting practically to all possible combinations. Over all these circuits at once the carriers are adapted to move without intersecting in crossing, or returning upon themselves in any case, the movement of all the carriers being invariably clockwise or the reverse. Such triple unit H-shaped loop may be said to form a basis or element, by grouping or repeating which, my complete preferred construction is attained. This is illustrated for example in Fig. 4 of the drawings. In general this fundamental triple unit H-shaped loop is formed by the combination of two fixed loops M and N and a connecting traveling cross track in the form of an entirely separate loop O, having its looped ends wholly inside of and away from said parallel side lines.

P designates switches adapted to connect said cross track loop to the side lines, these switches curving away from the looped portions of the cross track. In some cases the switches P are dispensed with and the end portions X of the loops O made to constitute switches adapted to be swung into register with the loops M and N (see Fig. 8) or with each other.

The methods of use and operation are too numerous to permit of being more than indicated in their general nature. For example, assume that a pile of merchandise located at X is to be sorted out and transported rapidly to four different localities Y, Z, W and V. The different traveling cross tracks and traveling sub-cross tracks would be arranged substantially in the manner shown, and then a continuous succession of carriers would be loaded at the point X and would travel therefrom in continuous circuits in the direction of the arrows to the various points of deposit, the different carriers traversing either the same or different circuits, but following actual circuits either clockwise or anticlockwise in all cases, and not reversing or traveling in opposite directions on lines at any point of the system.

Where a yard or pier is wholly open without walls or posts, the traveling cross tracks may be mounted on standards 20, supported on trucks 21 as shown in Fig. 7. In this case the system is particularly adapted to be used with only open area loops, the fixed lines of the system being suspended from fixed bridges or girders, or any other desired way.

What I claim is:—

1. In an overhead railway, the combination with a carrier having a down come a fixed overhead monorail line, a traveling cross track having an overhead monorail cross line adapted to connect with said fixed line in all positions of the cross track, and means for permitting movement of said carrier with its down come to every point of said lines.

2. In an overhead railway, the combination with a carrier having a down come a fixed overhead monorail loop having a pair of opposite parallel side lines, a traveling cross track having an overhead monorail cross line adapted to connect with both of said parallel lines in all positions of the cross track, and means for permitting movement of the carrier with its down come to every point of said lines.

3. In an overhead railway, the combination with a fixed overhead monorail loop having a pair of opposite parallel side lines, of a traveling cross track having an overhead monorail cross line adapted to connect with both of said parallel lines in all positions of the cross track, and switches for opening such connection.

4. In an overhead railway, the combination with a fixed overhead monorail loop having a pair of opposite parallel side lines, of a traveling cross track having an overhead monorail cross line adapted to connect with both of said parallel lines in all positions of the cross track, and a traveling sub-cross track.

5. In an overhead railway, the combination with a fixed overhead monorail loop having a pair of opposite parallel side lines, of a traveling cross track having lines joining said parallel lines, and a traveling sub-cross track.

6. In an overhead railway, the combination with a fixed overhead monorail loop having a pair of opposite parallel side lines, of a pair of traveling cross tracks each having a line adapted to join said parallel lines, and a traveling sub-cross track having a line adapted to join the lines of said traveling cross tracks.

7. In an overhead railway, the combination with a fixed open area monorail loop, a fixed obstructed area monorail loop, switches for joining said loops in one large loop or separate individual loops, and a traveling cross track having a line adapted to join opposite parallel sides of said open area loop.

8. In an overhead railway, the combination with a fixed open area monorail loop, a fixed obstructed area monorail loop, switches for sub-dividing said obstructed area loop into a plurality of smaller loops or merging said obstructed and open area loops into one large loop, and a traveling cross track having a line adapted to join opposite parallel sides of said open area loop.

9. In an overhead railway, the combination with a fixed open area monorail loop, a fixed obstructed area monorail loop, switches for sub-dividing said obstructed area loop into a plurality of smaller loops or merging said obstructed and open area loops into one large loop, a traveling cross track having a line adapted to join opposite parallel sides of said open area loop, and a traveling sub-cross track having a line adapted to join the line of said traveling cross track.

10. In an overhead railway, the combination with a fixed overhead monorail loop having a pair of opposite parallel side lines, of a traveling cross track having a pair of overhead monorail cross lines looped together at their ends wholly inside of and away from said parallel side lines, and switches adapted to connect said cross lines to said side lines and curving in directions away from said looped portions of said cross lines.

11. A combination of overhead monorail loops over which carriers having down comes are adapted to pass in a plurality of different circuits in the same rotative direction of the loops at every point in the system.

12. In an overhead railway, the combination with two fixed monorail loops having parallel inside opposite side lines, of a traveling cross track having a pair of overhead monorail cross lines looped together at their ends wholly inside of and away from said parallel side lines, and switches adapted to connect said cross lines to said side lines and curving in directions away from said looped portions of said cross lines.

13. In an overhead railway, the combination with a fixed overhead monorail loop having a pair of opposite parallel side lines, of a traveling cross track having a pair of overhead monorail cross lines looped together at their ends wholly inside of and away from said parallel side lines, and means for connecting said cross lines to said side lines.

14. In an overhead railway, the combination with a traveling bridge of a track on which said bridge travels, an overhead monorail fixed line on a different level from said track, and an overhead monorail cross line carried by said bridge on the same level as said fixed line and adapted to connect therewith in all positions of said bridge.

15. In an overhead railway, the combination with a traveling bridge of a track on which said bridge travels, a pair of overhead monorail fixed loops on a different level from said track, and an overhead monorail cross line carried by said bridge on the same level as said loop and adapted to connect therewith in all positions of said bridge.

In testimony whereof, I have signed my name to this specification in the presence of two subscribing witnesses, this fourth day of December 1909.

HENRY M. HARDING.

Witnesses:
WALDO M. CHAPIN,
ALFRED W. PROCTOR.